US012801344B2

(12) United States Patent
Tai et al.

(10) Patent No.: US 12,801,344 B2
(45) Date of Patent: Nov. 17, 2026

(54) SORTING METHOD, STORAGE MEDIUM AND ELECTRONIC DEVICE

(71) Applicant: MONTAGE TECHNOLOGY CO., LTD., Shanghai (CN)

(72) Inventors: Longfei Tai, Shanghai (CN); Qi Xu, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 19/078,263

(22) Filed: Mar. 12, 2025

(65) Prior Publication Data

US 2025/0291545 A1 Sep. 18, 2025

(30) Foreign Application Priority Data

Mar. 15, 2024 (CN) ........................ 202410302884.X

(51) Int. Cl.
*G06F 7/24* (2006.01)
*G06F 16/901* (2019.01)

(52) U.S. Cl.
CPC ............ *G06F 7/24* (2013.01); *G06F 16/9024* (2019.01)

(58) Field of Classification Search
CPC ........................................................ G06F 7/24
USPC ........................................................ 707/752
See application file for complete search history.

(56) References Cited

U.S. PATENT DOCUMENTS

2009/0157724 A1* 6/2009 De Peuter .............. G06Q 10/10 707/999.102
2010/0060643 A1* 3/2010 Kolipaka ................ G06T 11/26 345/440
2015/0302113 A1* 10/2015 Rosenberg ............ G06F 16/211 707/798
2021/0004263 A1* 1/2021 Moita ..................... G06F 9/485
2024/0119092 A1* 4/2024 Rosendahl ................ G06F 8/35

* cited by examiner

*Primary Examiner* — Muluemebet Gurmu
(74) *Attorney, Agent, or Firm* — IPRTOP LLC

(57) ABSTRACT

A sorting method, a storage medium and an electronic device. The sorting method includes acquiring a directed acyclic graph to be sorted, and recording input nodes and output nodes of each node in the directed acyclic graph; obtaining a global depth of each node based on input-output relationships among nodes in the directed acyclic graph, thereby generating a global depth table, wherein the global depth of each node is defined as a number of nodes involved from said node in the directed acyclic graph along directed edges to a corresponding output of said node; and determining an execution order of each node based on the global depth of each node and a total number of the nodes in the directed acyclic graph, and generating a node sorting table. The sorting method can improve computational efficiency.

16 Claims, 8 Drawing Sheets

SORTING METHOD, STORAGE MEDIUM AND ELECTRONIC DEVICE

FIELD OF TECHNOLOGY

The present disclosure belongs to the field of data processing technology, in particular it relates to a sorting method, a storage medium, and an electronic device.

BACKGROUND

A Directed Acyclic Graph (DAG) is a graph structure composed of nodes and directed edges, characterized by the absence of cyclic paths. In a DAG, each node represents an element, and each directed edge represents a unidirectional relationship between two elements. Currently, DAGs are widely used in various fields, including database design, digital signal processing, algorithm compilation, and artificial intelligence (AI).

Taking an AI network model as an example, it is essentially a computation graph, which is a type of a DAG. In the computation graph of an AI model, each node corresponds to an operation (e.g., splitting, convolution, etc., as shown in FIG. 1), while each edge represents the data transmission (input/output) relationship between nodes.

Upon introducing the computation graph within an AI model, it becomes necessary to sort the nodes within the computation graph to determine the operation order of each node. Existing technologies provide various sorting algorithms, such as Depth-First Search (DFS) and Breadth-First Search (BFS). However, these algorithms typically only consider the dependencies of edges on the current node during sorting, and fail to account for the interdependence of edges across the entire computation graph. When a computation graph contains complex edge dependencies, conventional algorithms may produce a sorted order in which the "edge" spans between adjacent nodes are large, meaning that the data correlation between successive operations is low. This can lead to data retention, increasing resource overhead for hardware memory, and potentially causing memory transfers that decrease the operation efficiency of the entire network.

SUMMARY

The present disclosure provides a sorting method, a storage medium, and an electronic device to improve the computational efficiency of a network model.

In a first aspect, one embodiment of the present disclosure provides a sorting method, said sorting method includes: acquiring a directed acyclic graph to be sorted, and recording input nodes and output nodes of each node in the directed acyclic graph; obtaining a global depth of each node based on input-output relationships among nodes in the directed acyclic graph, thereby generating a global depth table, and the global depth of each node is defined as a number of nodes involved from said node in the directed acyclic graph along directed edges to a corresponding output of said node; determining an execution order of each node based on the global depth of each node and a total number of the nodes in the directed acyclic graph, and generating a node sorting table.

In one embodiment of the first aspect, obtaining the global depth of the nodes in the directed acyclic graph includes: for any node in the directed acyclic graph, sequentially searching for output nodes of each following node in an output direction until no more output nodes are found, and the global depth of said node is defined as N+1, where N is a number of all nodes found during the search.

In one embodiment of the first aspect, for any of the nodes in the directed acyclic graph, the execution order of said node is defined as a difference between the total number of the nodes in the directed acyclic graph and the global depth of said node.

In one embodiment of the first aspect, after obtaining the global depth of each node, the sorting method further includes: determining whether a heuristic sorting set exists, and if the heuristic sorting set exists, updating global depths of corresponding nodes in the directed acyclic graph based on computational dependency relationships among nodes in the heuristic sorting set, execution order relationships among the corresponding nodes in the directed acyclic graph are the same as those among the nodes in the heuristic sorting set.

In one embodiment of the first aspect, the heuristic sorting set includes a previous sorting result corresponding to the directed acyclic graph and a preset computational order among the nodes.

In one embodiment of the first aspect, after obtaining the execution order of each node and generating the node sorting table, the sorting method further includes: searching the node sorting table to confirm whether there exist nodes with a same execution order; when the nodes with the same execution order exist, then updating execution orders of the nodes with the same execution order according to an interval sorting rule, such that the execution orders of the nodes are different; and when the interval sorting rule includes: when one of the nodes in the directed acyclic graph depends on multiple nodes, the node among the multiple nodes being depended on that has fewer data dependency relationships in the directed acyclic graph is ordered later during interval sorting.

In one embodiment of the first aspect, searching the node sorting table includes sequentially searching each node corresponding to its execution order in the node sorting table from largest to smallest.

In one embodiment of the first aspect, for each execution order, searching is paused upon finding two nodes with the same execution order, and execution orders of the two nodes with the same execution order are updated according to the interval sorting rule.

In one embodiment of the first aspect, updating the execution order of the two nodes with the same execution order according to the interval sorting rule includes: determining the interval starting point and interval endpoint for each of the two nodes with the same execution order; updating the executions order of the two nodes with the same execution order by comparing numbers of nodes included in respective intervals corresponding to the two nodes.

In one embodiment of the first aspect, determining the interval start point and interval end point for each of the two nodes with the same execution order includes: when there exist junction nodes between the two nodes with the same execution order in an input direction, using a latest-In-Junction node as the interval start point for each of said two nodes; otherwise, using respective inputs corresponding to said two nodes as their interval start points; when there exist junction nodes between the two nodes with the same execution order in an output direction, using a latest-Out-Junction node as the interval end point for each of said two nodes; otherwise, using the nodes themselves as their respective interval end points.

In one embodiment of the first aspect, updating the executions order of the two nodes with the same execution order by comparing numbers of nodes included in respective intervals corresponding to said two nodes includes: the numbers of nodes included in the respective intervals corresponding to the two nodes with the same execution order are different, among the two nodes, using the node corresponding to the interval with fewer nodes as a next node for the other node; and when the numbers of nodes included in the respective intervals corresponding to the two nodes with the same execution order are the same, selectively adjusting the intervals corresponding to the two nodes based on their interval start points.

In one embodiment of the first aspect, selectively adjusting the intervals corresponding to the two nodes with the same execution order based on their interval start points includes: when the interval start points of the two nodes with the same execution order are the latest-In-Junction node in the input direction, adjusting the respective intervals corresponding to said two nodes; when the interval start points of said two nodes are their respective inputs, randomly updating the execution orders of said two nodes.

In one embodiment of the first aspect, adjusting the respective intervals corresponding to the two nodes with the same execution order includes: using the inputs corresponding to the two nodes as their interval start points, using the nodes themselves as their interval end points, and then updating the execution orders of the two nodes by comparing the numbers of nodes comprised in their respective intervals.

In one embodiment of the first aspect, randomly updating the execution orders of the two nodes with the same execution order includes: randomly selecting one of the two nodes as the next node for the other node.

In one embodiment of the first aspect, for each execution order, the searching is paused after finding all nodes corresponding to said execution order, and execution orders of all nodes corresponding to said execution order are updated according to the interval sorting rule.

In a second aspect, the present disclosure also provides a computer-readable storage medium on which a computer program is stored, when executed by a processor, the computer program implements any of the sorting methods described in the first aspect of the present disclosure.

In a third aspect, the present disclosure provides an electronic device, including: a memory storing a computer program; a processor in communication with the memory, configured to execute any of the sorting methods described in the first aspect when the computer program is invoked.

DETAILED DESCRIPTION

The embodiments of the present disclosure will be described below. Those skilled can easily understand disclosure advantages and effects of the present disclosure according to contents disclosed by the specification. The present disclosure can also be implemented or applied through other different specific embodiments. Various details in this specification can also be modified or changed based on different viewpoints and disclosures without departing from the spirit of the present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, number and proportion of each component can be changed as needed, and the layout of the components can also be more complicated.

Directed Acyclic Graphs (DAGs) are widely used in many fields such as database design, digital signal processing, algorithm compilation, and artificial intelligence. When applying DAGs in these fields, it is often necessary to sort the nodes within the DAG. For ease of explanation, the computation graph of an artificial intelligence network model will be used as a non-limiting example to provide an illustrative introduction to DAGs and their sorting.

Figure 1:
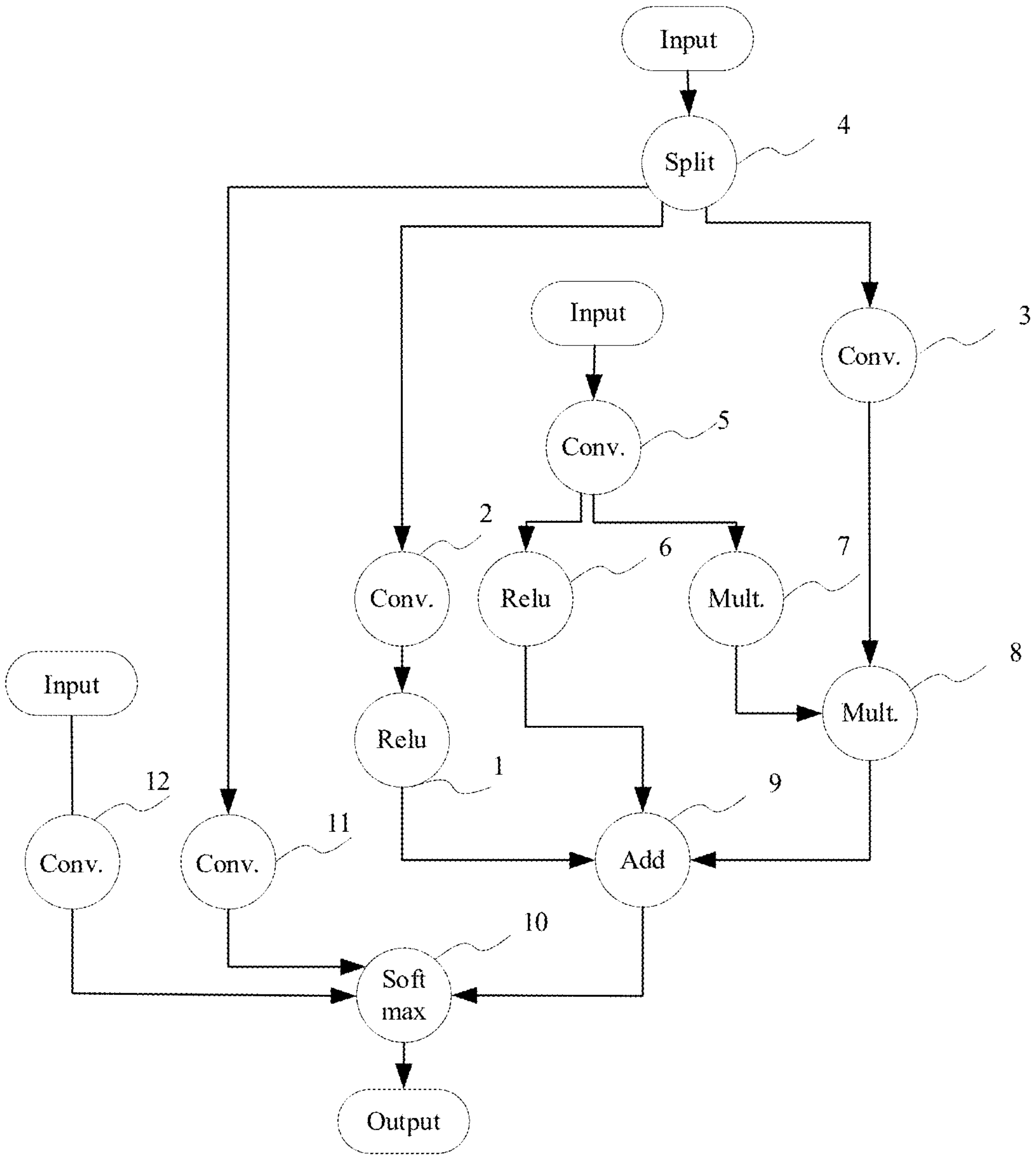
FIG. 1 shows a schematic diagram of a DAG.
Figure 2A:
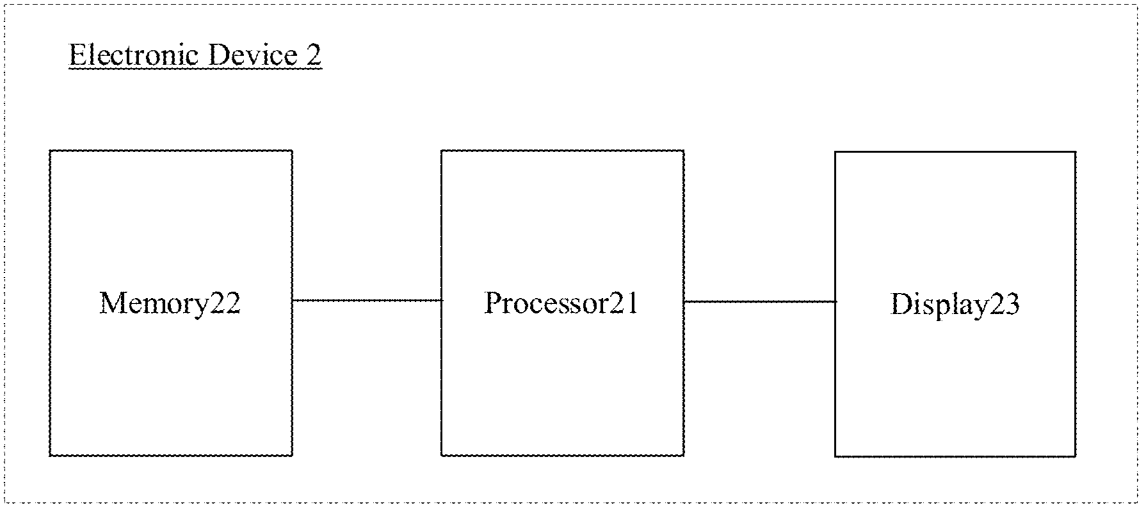
FIG. 2A shows a schematic structural diagram of an electronic device according to one embodiment of the present disclosure.

The embodiments of the present disclosure provide a sorting method that can be applied to an electronic device. FIG. 1 shows a schematic diagram of a DAG and FIG. 2A shows a schematic diagram of a hardware structure of an electronic device 2. As shown in FIG. 2A, the electronic device 2 includes at least one processor 21 and at least one memory 22.

The processor 21 may be one or more of a Central Processing Unit (CPU), Neural network Processing Unit (NPU), Graphics Processing Unit (GPU), microprocessor, microcontroller, main processor, controller, or Application Specific Integrated Circuit (ASIC). The processor 21 is configured to execute various types of instructions and operations, such as executing software or firmware programs stored in the memory 22, enabling the electronic device 2 to provide various functions and services. For example, the processor 21 can execute programs or process data to implement the sorting method provided by the embodiments of this application.

In some embodiments, the processor 21 may be a neural network processing unit designed to accelerate neural network computations, addressing the efficiency issues faced by traditional chips during neural network operations.

It should be noted that the term "neural network processing unit" does not restrict the scope of the present disclosure. In other application scenarios, the neural network processing unit can be adapted or replaced by other processors with similar functionalities, such as a Tensor Processing Unit (TPU) or a Deep Learning Processing Unit (DPU).

The memory 22 may include volatile memory, such as Random Access Memory (RAM) or cache. The memory 22 may also include as well as non-volatile memory, such as Read-Only Memory (ROM), flash memory, Hard Disk Drive (HDD), or Solid State Drive (SSD). The memory 22 can be used to store program instructions and data for the processor 21 to execute and implement the sorting method provided by embodiments according to the present disclosure.

In some embodiments, the electronic device 2 can also communicate with one or more external devices, such as terminals, displays, etc., through an input/output (I/O) interface. Additionally, the electronic device 2 may communicate with one or more networks via a network adapter.

In some embodiments, the electronic device 2 may also include a display 23 for displaying a graphical user interface (GUI) related to the sorting method provided by embodiments according to the present disclosure.

Figure 2B:
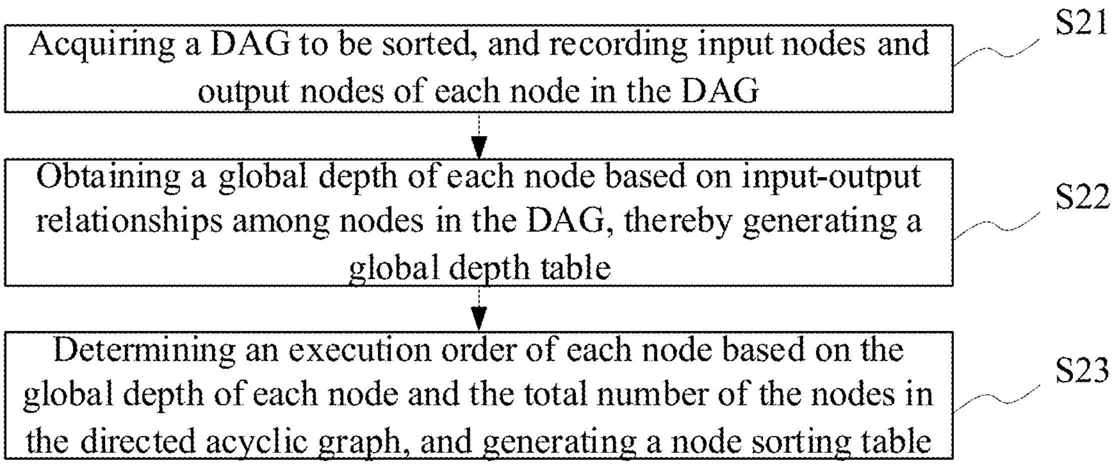
FIG. 2B shows a flowchart illustrating a sorting method according to one embodiment of the present disclosure.

FIG. 2B shows a flowchart of the sorting method provided by one embodiment according to the present disclosure, said sorting method can be applied, for example, to the processor 21 shown in FIG. 2A. As shown in FIG. 2B, the sorting method provided by the present disclosure may include steps S21 to S23 as follows:

S21: acquiring a DAG to be sorted, and recording input nodes and output nodes of each node in the DAG. The DAG may represent a computation graph of an artificial intelligence (AI) network, but the present disclosure is not limited to this.

In the computation graph of an AI network, the DAG consists of nodes and directed edges, where the nodes represent operators (operations), such as split nodes, convolution nodes, Relu nodes, Softmax nodes, etc.; the directed edges (also referred to as "edges") represent data dependencies between the nodes, indicating that there is a data dependency between two nodes directly connected by the edge. Each node has at least one input edge (for inputting data) and one output edge (for outputting data). For example, in FIG. 1, Node 8 has input edges connected to Node 3 and Node 7, making Node 3 and Node 7 the input nodes of Node 8; an output edge of Node 8 is connected to Node 9, making Node 9 its output node. For Node 10 in FIG. 1, its output edge does not connect to any node, meaning Node 10 has no output node. Its input edges connect to Node 12, Node 11, and Node 9, making these nodes the input nodes of Node 10.

S22: obtaining a global depth of each node based on input-output relationships among nodes in the DAG, thereby generating a global depth table, wherein for each node, the global depth of a node is defined as the number of nodes involved from the node in the directed acyclic graph along directed edges to an output of the DAG.

In some embodiments, the global depth of each node can be obtained through traversal: for any given node, starting from that given node, each output node is progressively searched downward until there are no more output nodes; the global depth of the node is then N+1, where N is the number of nodes found during the search, and the additional 1 accounts for the given node itself.

Taking node 5 in FIG. 1 as an example, the output nodes of Node 5 are Node 6 and Node 7. Output nodes of Node 6 and Node 7 are Node 9 and Node 8, respectively. The output node of Node 8 is Node 9, the output node of Node 9 is Node 10, and output node of Node 10 is empty, indicating the end of the traversal. Thus, starting from Node 5 in the DAG, the nodes involved (including Node 5 itself) along the directed edges to the output of the DAG include Node 5 itself and Node 6 through Node 10, the total number of involved nodes is six, so the global depth of Node 5 is six. By following this method, the global depth of other nodes can be similarly determined.

S23: determining an execution order of each node based on the global depth of each node and the total number of the nodes in the directed acyclic graph, and generating a node sorting table.

In some embodiments, the execution order of each node can be the difference between the total number of nodes in the DAG and the global depth of the node. Continuing with the example of Node 5 in FIG. 1, Node 5 has a global depth of six, and the DAG shown in FIG. 1 contains twelve nodes in total, so the execution order of Node 5 is calculated as twelve−six=six.

In some embodiments, after determining the global depth of each node in step S22, the sorting method may include: determining whether a heuristic sorting set exists, and if the heuristic sorting set exists, updating global depths of corresponding nodes in the directed acyclic graph based on computational dependency relationships among nodes in the heuristic sorting set, execution order relationships among the nodes in the directed acyclic graph are the same as those among the corresponding nodes in the heuristic sorting set. Subsequently, in step S23, the updated global depths of nodes and the total number of the nodes in the DAG are used to determine the execution order of each node.

The heuristic sorting set may, for example, include the result of the previous sorting of the DAG. It can be understood that during the compilation process, an AI compiler may compile a DAG for multiple times, with each compilation simplifying, merging, or transforming nodes within the DAG. To ensure consistency in the relative order of nodes between successive compilations, the sorting result from the previous compilation (before the current compilation) can be used as a reference to update the global depths of the nodes obtained during the current compilation.

Figure 3:
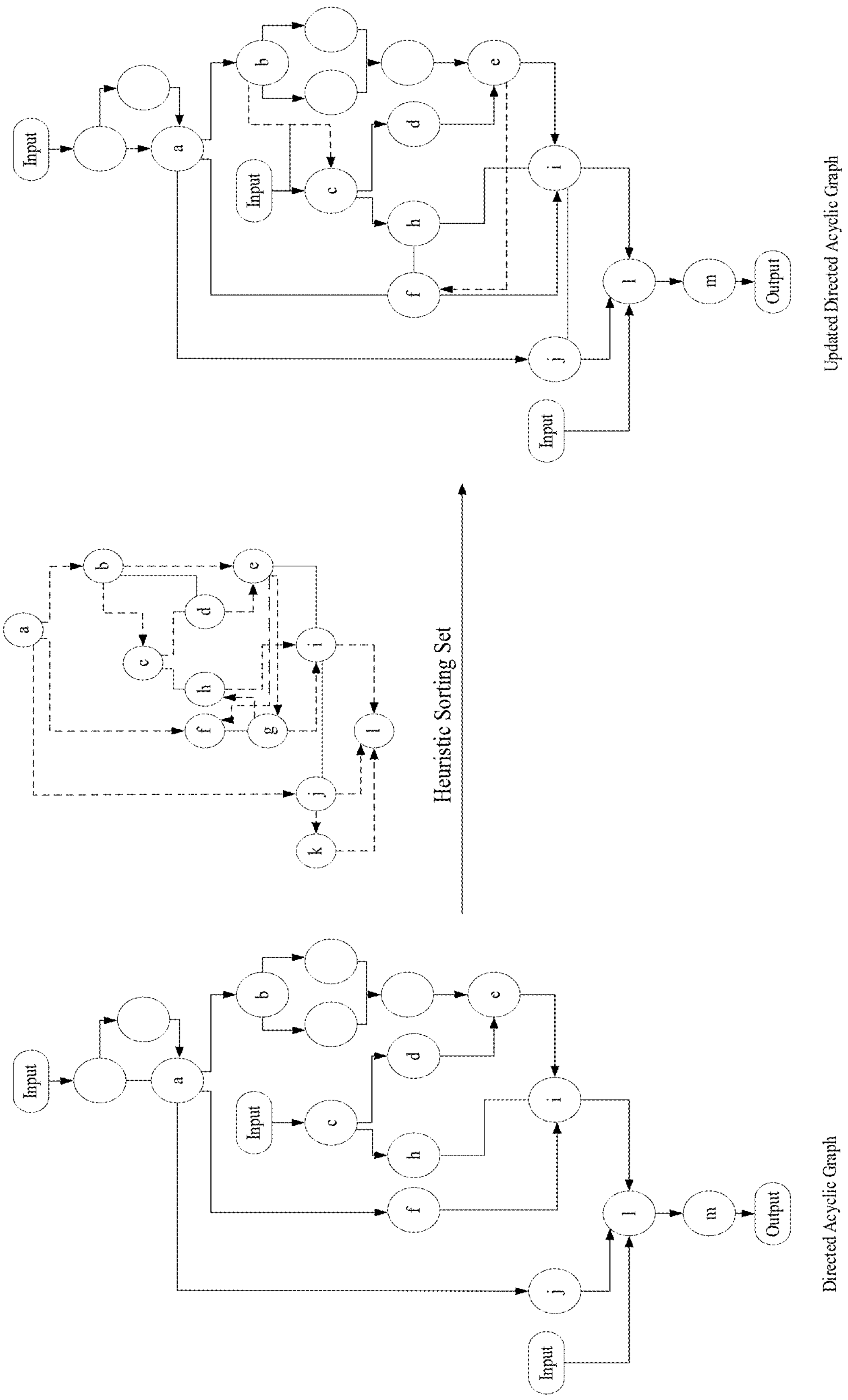
FIG. 3 shows a schematic diagram of updating a DAG based on a heuristic sorting set according to one embodiment of the present disclosure.

FIG. 3 illustrates a schematic diagram of updating a DAG according to a heuristic sorting set, the left side of FIG. 3 shows the original DAG, and the right side shows the DAG after being updated according to the heuristic sorting set. In the DAG on the left side of FIG. 3, taking Node e and Node f as examples, Node e and Node f have the same global depth of four (for Node e, the path to the output involves Node e, Node i, Node l, Node m; for Node f, the path involves Node f, Node i, Node l, Node m). According to the formula for determining execution order (the execution order of the node=total number of nodes in the DAG-global depth of the node), Node e and Node f initially have the same execution order. However, in the heuristic sorting set shown in FIG. 3, Node f is required to execute after Node e. Thus, the global depths of the nodes in the DAG are updated based on the computational dependency relationships in the heuristic sorting set, ensuring that the execution order between Node e and Node f in the DAG reflects that specified in the heuristic sorting set. Similarly, in the heuristic sorting set, Node c is executed after Node b, and Node j is executed after Node i, these relationships require updating the global depths of nodes in the DAG according to the computational dependency relationships specified in the heuristic sorting set. The right side of FIG. 3 shows the DAG corresponding to the updated global depth table. It can be understood that there is a computational dependency between Node e and Node f in the heuristic sorting set, meaning that the computation of Node f depends on the completion of the computation of Node e. In the updated DAG on the right side of FIG. 3, the computational dependency between nodes is represented with dashed lines. As shown in the updated DAG on the right side of FIG. 3, after updating based on the heuristic sorting set, the global depth of Node e becomes seven (involving Node e, Node f, Node h, Node i, Node j, Node l, Node m), and the global depth of Node f becomes six (involving Node f, Node h, Node i, Node j, Node l, Node m), meaning that Node f is executed after Node e.

In some other embodiments, the heuristic sorting set may also include predefined execution orders between the nodes. It can be understood that in certain scenarios, it may be necessary to impose constraints on execution orders of certain nodes. For example, in the left-side graph of FIG. 3, there is no data input-output relationship between Node j and Node c, and if a specific scenario requires that Node j to be executed before Node c, their global depths need to be adjusted accordingly, which is realized by a method similar to that used with the heuristic sorting set and will not be elaborated further here.

Figure 4:
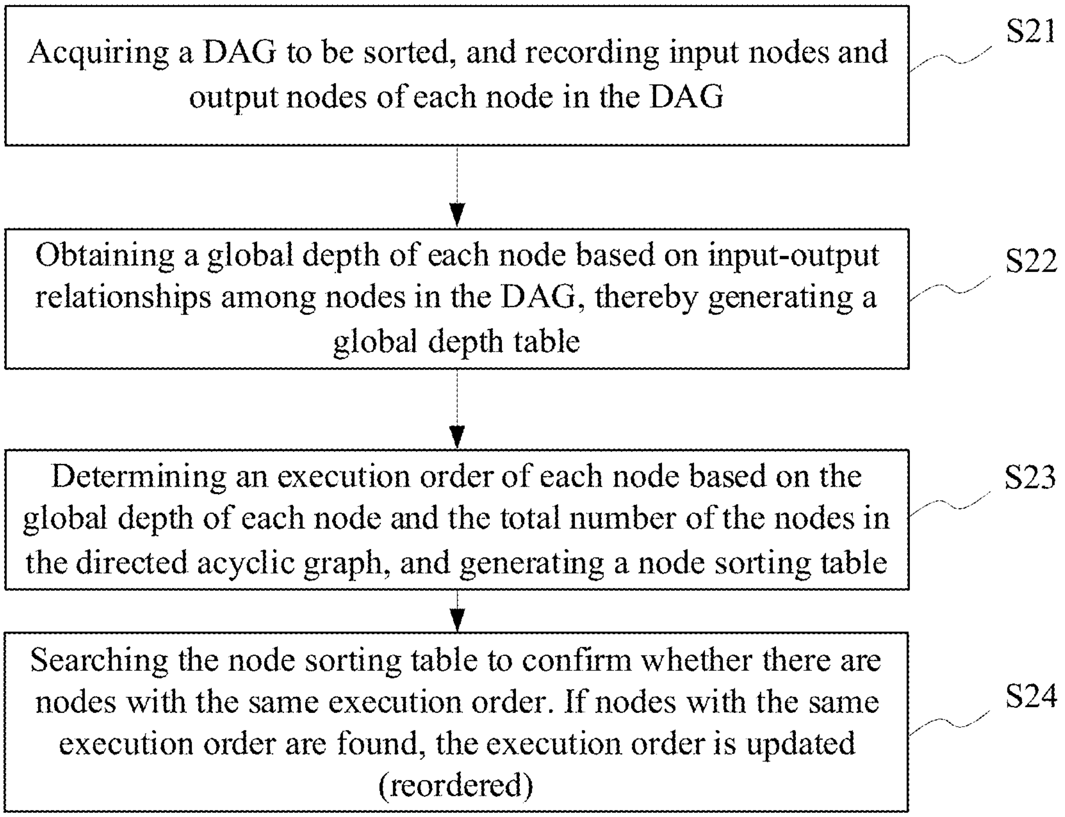
FIG. 4 shows a flowchart illustrating a sorting method according to one embodiment of the present disclosure.

Referring to FIG. 4, in some embodiments, after obtaining the execution order of each node in step S23, the sorting method may include step S24: searching the node sorting table to confirm whether there are nodes with the same execution order. If nodes with the same execution order are found, the execution order is updated (reordered) according to an interval sorting rule to ensure each node has a unique execution order. The interval sorting rule is that when a node (operator) depends on multiple other nodes, the nodes with fewer overall data dependencies in the DAG are placed later during interval sorting.

Figure 5A:
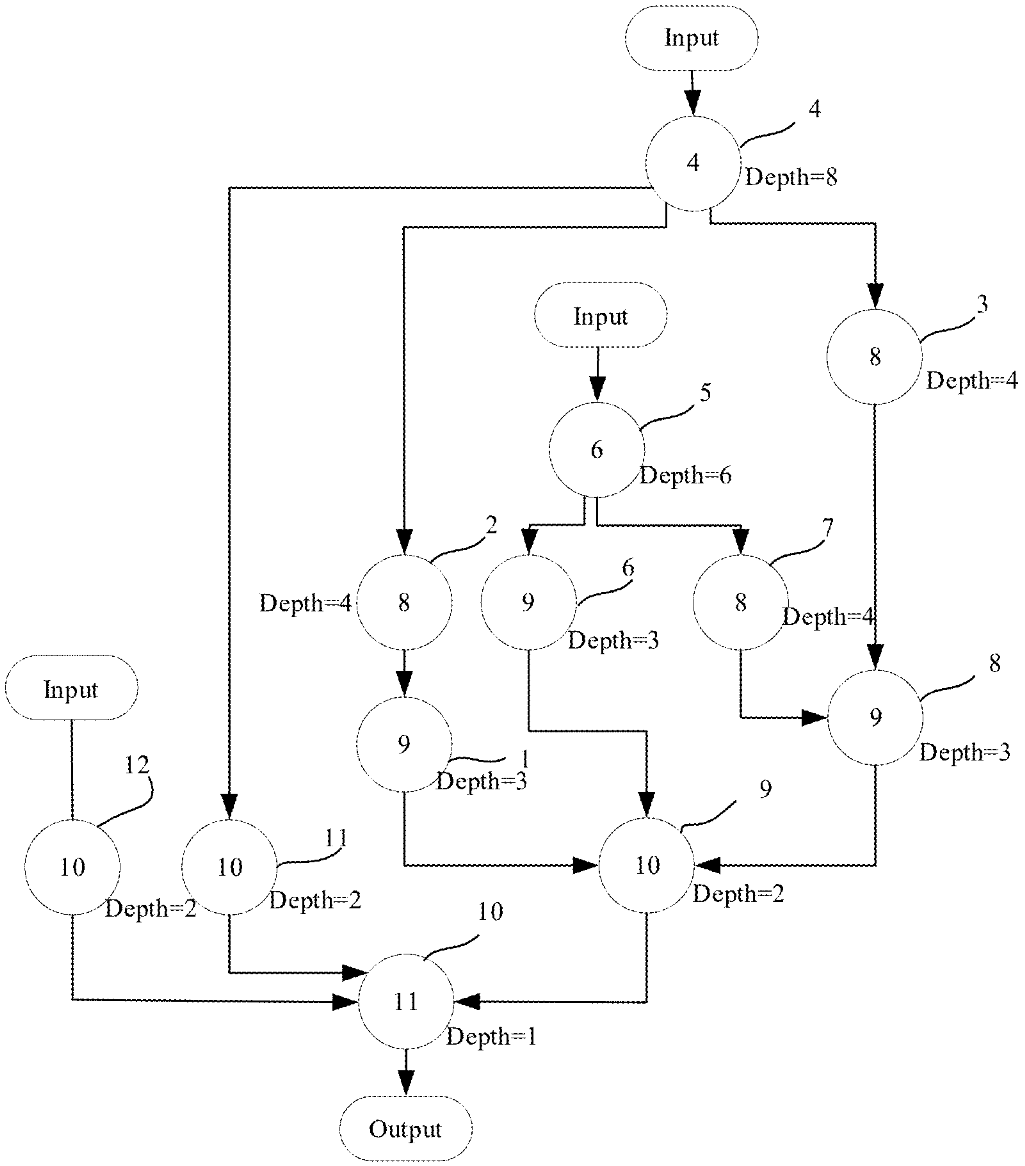
FIG. 5A shows a schematic diagram of execution orders of nodes obtained in step S23 according to one embodiment of the present disclosure.

In some embodiments, the confirmation of whether there are nodes with the same execution order can be done by searching nodes corresponding to each execution order one by one. As shown in FIG. 5A, FIG. 5A illustrates the execution order of each node in FIG. 1 obtained according to step S23. In FIG. 5A, the number inside the circle of each node represents its execution order, and the depth values correspond to the global depths of the nodes obtained in step S22. Referring to FIG. 5A, it can be seen that there are multiple groups of nodes with the same execution order in the DAG.

To accurately and exhaustively identify all groups of nodes with identical execution orders, in one embodiment, when searching nodes corresponding to any given execution order, nodes are sequentially searched in a descending order of the given execution order obtained in step S23. Taking FIG. 5A as an example, nodes with an execution order of 11 are searched first. If only one node with an execution order of 11 is found, the search proceeds to nodes with an execution order of 10, as shown in FIG. 5A, there are three nodes with an execution order of 10 (Node 9, Node 11, and Node 12).

In some embodiments, when two nodes with the same execution order are found during the search for each execution order, the search may be paused, and the execution order of the two nodes is updated according to the interval sorting rule. After updating, the search process and the update process (if necessary) are repeated until all execution orders are traversed. For example, after finding two nodes with an execution order of 10 (such as Node 9 and Node 11 in FIG. 5A), the search may be paused, and the execution order of Node 9 and Node 11 is updated according to the interval sorting rule. After the update, the search process and the update process (if necessary) are repeated until all execution orders are traversed.

When applying the interval sorting rule, it is necessary to first determine the interval start point and interval end point of each of the two nodes with the same execution order, thereby identifying the interval corresponding to each node. The nearest junction node in the input direction of the two nodes (also referred to as latest-In-Junction node) is preferably chosen as the interval start point. If there is no latest-In-Junction node, the input of each of the two nodes can be used as its interval start point. The nearest junction node in the output direction of the two nodes is preferably chosen as the interval end point (also referred to as latest-Out-Junction node). If there is no latest-Out-Junction node, each of the two nodes itself can serve as its interval end point. It can be understood that the interval corresponding to each node will necessarily include the node itself.

After determining the intervals corresponding to the two nodes with the same execution order, the execution order of the nodes can be updated based on the number of nodes included within the interval corresponding to each node. In some embodiments, the execution order of nodes is updated based on the number of nodes involved within the interval corresponding to each node.

In some embodiments, adjusting the execution order of nodes based on the number of nodes involved within the interval corresponding to each node may include: if the numbers of nodes within the respective intervals corresponding to the two nodes are different, among the two nodes, using the node corresponding to the interval with fewer nodes as a next (execution) node for the other node, thereby changing the global depth of the nodes. If the numbers of nodes within the respective intervals corresponding to the two nodes are the same, selectively adjusting the intervals corresponding to the two nodes based on their interval start points.

Specifically, selectively adjusting the respective intervals corresponding to the two nodes based on their interval start points include: if the interval start points of the two nodes are the latest-In-Junction node in the input direction, the respective intervals of the two nodes can be adjusted. For example, the adjustment may involve setting the two nodes themselves as the interval end points and using the respective inputs of the two nodes as the interval start points. If the interval start points of the two nodes are their respective inputs, randomly updating the execution orders of the two nodes (random ordering). For instance, one node can be randomly selected to be the next node of the other.

Figure 5B:
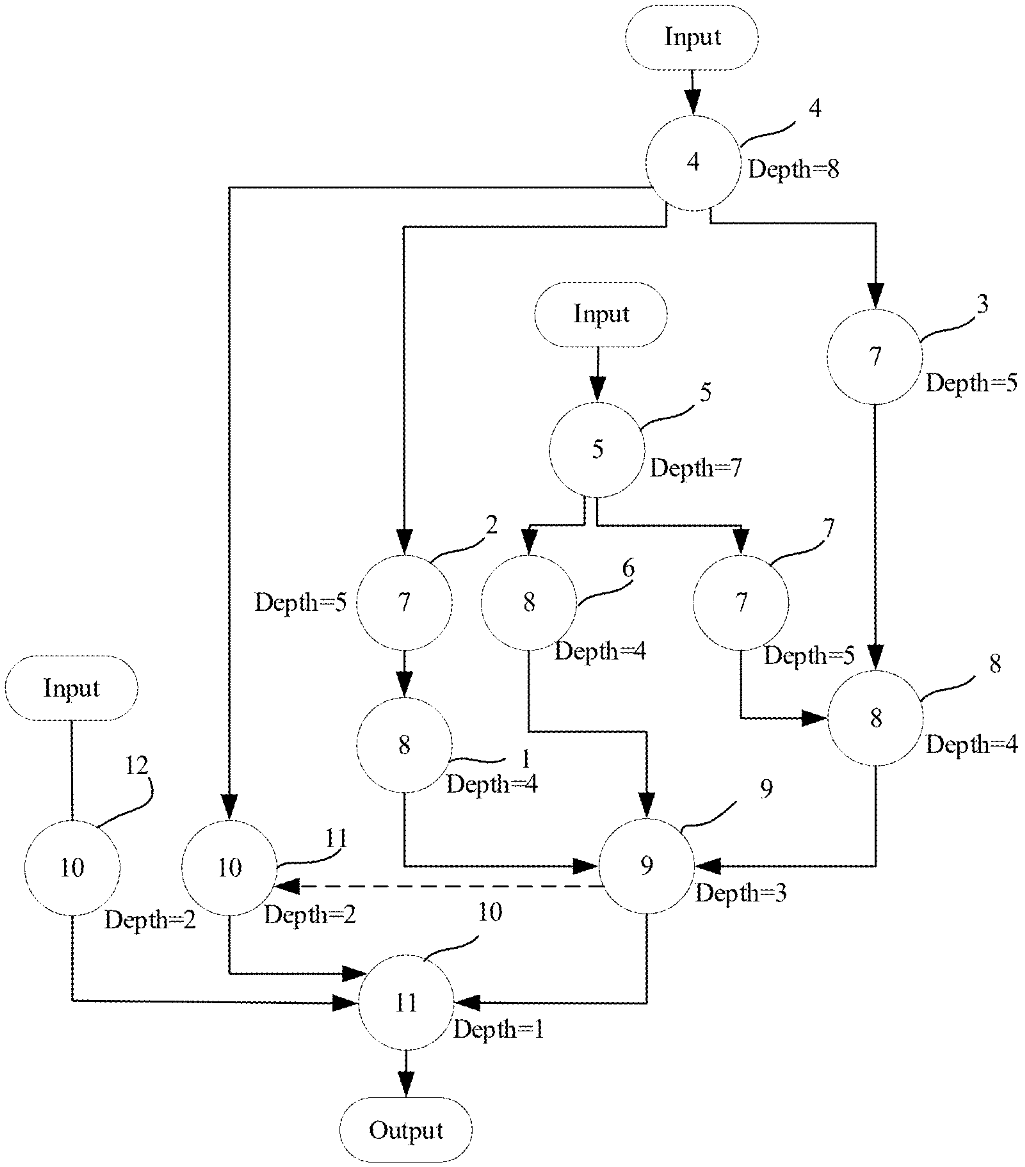
FIG. 5B shows a schematic diagram of execution orders of the updated nodes.

In one embodiment, if the numbers of nodes within the intervals corresponding to the two nodes remain the same after adjusting the intervals of the two nodes, the execution orders of the nodes can be randomly updated (random ordering). Referring to FIG. 5A, as described above, for execution order 10, when two nodes with the same execution order (e.g., Node 9 and Node 11) are found, the execution orders of Node 9 and Node 11 can be sorted according to the interval sorting rule. As shown in FIG. 5A, the latest-In-Junction node for Node 9 and Node 11 is Node 4, and the latest-Out-Junction node for Node 9 and Node 11 is Node 10. Therefore, Node 4 can be taken as the interval start point for both Node 9 and Node 11, and Node 10 can be taken as the interval end point for both Node 9 and Node 11. The interval for Node 9 includes Nodes 4, 2, 1, 3, 8, 9, and 10, totaling seven different nodes, while the interval for Node 11 includes Nodes 4, 11, and 10, totaling three different nodes. Thus, the interval for Node 11 includes fewer nodes than the interval for Node 9. As a result, Node 11 can be designated as the next node after Node 9, as indicated by the dashed line in FIG. 5B. At this point, the execution order of Node 9 is decreased by one, becoming nine, and the global depth of Node 9 is increased by one, becoming three. Next, the searching continues for nodes with an execution order of 10, and this process is repeated until all execution orders have been traversed.

Figure 6A:
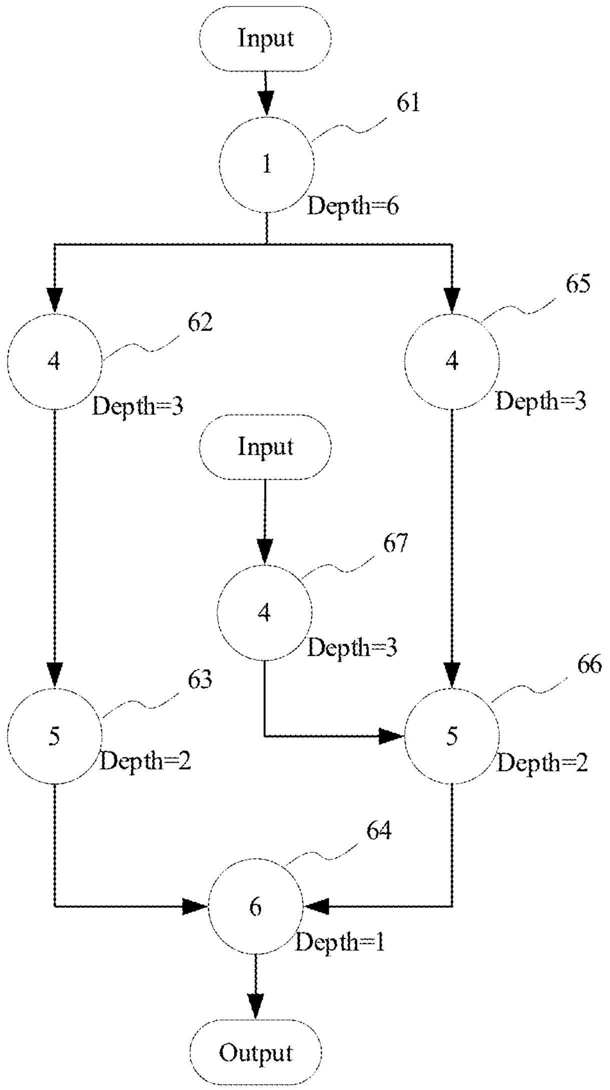
FIGS. 6A-6B show schematic diagrams of interval sorting according to embodiments of the present disclosure.
Figure 6B:
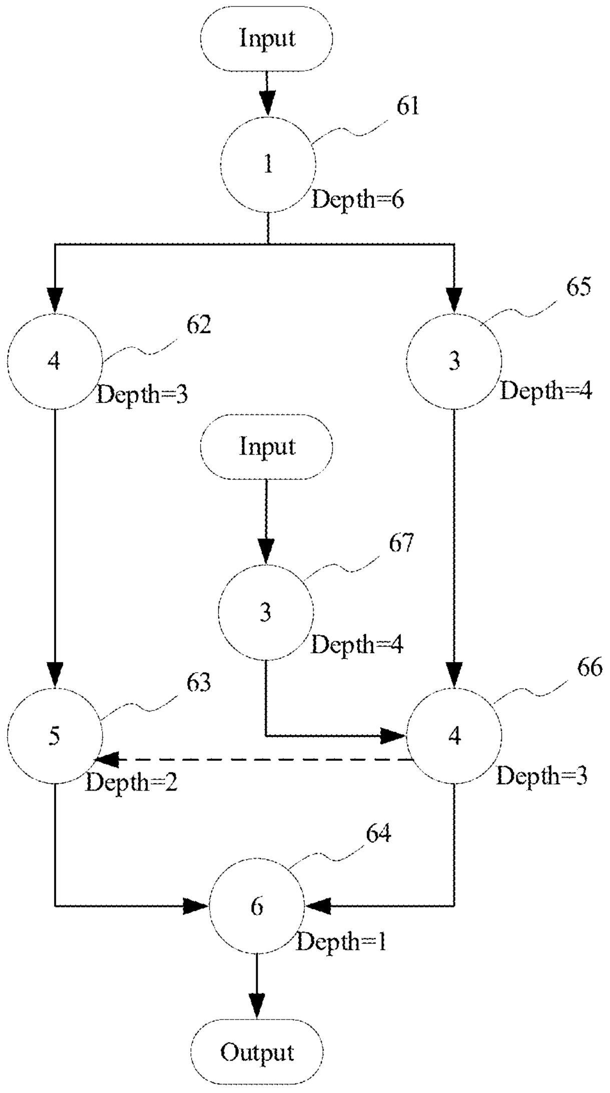

FIGS. 6A-6B show example diagrams of interval sorting according to an embodiment of this application. FIG. 6A is a node execution order diagram obtained based on the global depth table of nodes. As shown in FIG. 6A, Node 63 and Node 66 both have an execution order of 5. The latest-In-Junction node for Node 63 and Node 66 is Node 61, and the latest-Out-Junction node for Node 63 and Node 66 is Node 64, Node 61 is therefore taken as the interval start point for both Node 63 and Node 66, and Node 64 is taken as the interval end point or both Node 63 and Node 66. Thus, the interval for Node 63 includes Node 61, Node 62, Node 63, and Node 64, meaning the number of nodes in the interval for Node 63, denoted as M1=4. The interval for Node 66 includes Node 61, Node 65, Node 66, and Node 64, meaning the number of nodes in the interval for Node 66, denoted as M2=4, i.e., M1=M2. At this point, it is necessary to redefine the intervals for Node 63 and Node 66 by setting input of each node as its interval start and each node itself as its interval end. In other words, the interval start point for Node 63 is the input shown in FIG. 6A, and the interval end is Node 63 itself. The interval for Node 63 includes Node 61, Node 62, and Node 63, so the number of nodes in the interval for Node 63, denoted as M1'=3. Similarly, the interval start point for Node 66 is also the input shown in FIG. 6A, and the interval end is Node 66 itself. The interval for Node 66 includes Node 61, Node 65, and Node 66, so the number of nodes in the interval for Node 66, denoted as M2'=3. In other words, after redefining the intervals, the numbers of nodes included in the intervals for both nodes remain equal. Therefore, the order of these two nodes within the graph does not affect the overall sorting of the graph. Thus, one of these two nodes can be set as the subsequent node of the other. For instance, Node 63 can be set as the subsequent node of Node 66, as indicated by the dashed line in FIG. 6B. In this case, the global depth of Node 66 increases by one, becoming three, and its execution order decreases by one, becoming four, meaning the execution orders of Node 63 and Node 66 are no longer the same.

In some embodiments, for each execution order, after locating all the nodes corresponding to the execution order, the execution order of these nodes can then be sorted according to the interval sorting rule. For example, after identifying all nodes with an execution order of 10 (e.g., Node 9, Node 11, and Node 12 in FIG. 5A), the search can be paused, and the execution order of these three nodes can be updated based on the interval sorting rule. The specific method is similar to the above and will not be elaborated here.

From the above, it is clear that the present disclosure provides a sorting method. Compared to depth-first and breadth-first sorting algorithms, the sorting method provided in this application establishes data dependency and execution order relationships between each node in the network through data dependencies and a heuristic algorithm, thereby producing a global depth table that includes all nodes, the depth of each node within the DAG is unique in the global depth table. The order of all nodes in the DAG can be determined via the global depth table. This sorting method improves the data dependency relationships between nodes after sorting and reduces hardware memory usage, thus enhancing the computational efficiency of the entire network. Additionally, the sorting method provided in the present disclosure ensures consistency in the sorting order of the computation graph before and after the compiler performs simplifications, merges, and transformations when applied to the computation graph of an AI network model.

It should be noted that the scope of protection for the sorting method provided in this application is not limited to the execution order of steps listed in this embodiment. Any modifications, such as adding or removing steps or replacing steps based on the principles of this application, are also covered within the scope of protection of this application.

The present disclosure also provides a computer-readable storage medium containing a computer program. When executed by a processor, this computer program implements the sorting method provided in the present disclosure. The above-mentioned storage medium can be any accessible medium by a computer, or data storage devices such as a server or data center containing one or more integrated available media. The available medium may include magnetic media (e.g., floppy disks, hard drives, magnetic tapes), optical media (e.g., digital video discs (DVDs)), or semiconductor media (e.g., solid state drives (SSDs)).

Furthermore, the present disclosure provides an electronic device. This electronic device includes a memory and a processor. The memory stores a computer program the processor is in communication with the memory, executing the sorting method provided in this application when calling the computer program.

In the sorting method provided by the present disclosure, the global depth of each node is obtained based on the input-output relationships between all nodes in the DAG. The nodes are then sorted according to their global depth and the total number of nodes contained within the DAG. This approach enhances the data dependency relationships between nodes after sorting, reducing hardware memory usage and thereby significantly improving the computational efficiency of the entire network.

Additionally, in the present disclosure, the global depth of corresponding nodes in the DAG can be updated based on a heuristic sorting set, enabling heuristic sorting functionality. When using the sorting method provided by this embodiment to order the computation graph of an artificial intelligence network model, it ensures consistency in the ordering sequence each time the compiler simplifies, merges, and transforms the computation graph.

The descriptions of each flow or structure corresponding to the accompanying drawings each have their own focus. For parts that are not detailed in one flow or structure, please refer to related descriptions of other flows or structures.

The above-mentioned embodiments are merely illustrative of the principle and effects of the present application instead of restricting the scope of the present application. Modifications or variations of the above-described embodiments may be made by those skilled in the art without departing from the spirit and scope of the present application. Therefore, all equivalent modifications or changes made by those who have common knowledge in the art without departing from the spirit and technical concept disclosed by the present application shall be still covered by the claims of the present disclosure.

What is claimed is:

1. A sorting method, implemented by a processor of an electronic device for a computation graph of an artificial intelligence network model, the computation graph being a directed acyclic graph comprising nodes and directed edges, the method comprising:

acquiring the directed acyclic graph to be sorted by the processor, and recording, in a memory of the electronic device, input nodes and output nodes of each node in the directed acyclic graph; wherein each node in the directed acyclic graph corresponds to an operation of the artificial intelligence network model and each directed edge represents a data dependency between two nodes;

determining, by the processor, a global depth of each node by traversing, for each node in the directed acyclic graph, downstream nodes along directed edges until reaching an output node of the directed acyclic graph, and counting a number of nodes involved along traversal paths, thereby generating a global depth table;

determining, by the processor, an execution order of each node based on the global depth of each node and a total number of the nodes in the directed acyclic graph, wherein for a node in the directed acyclic graph, the execution order of the node is determined as a difference between the total number of nodes and the global depth of the node; and a node with a smaller global depth value is executed after a node with a larger global depth value; wherein nodes having a same execution order are further ordered based on data dependency relationships among the nodes; and generating, by the processor, a node sorting table according to the execution order, wherein the execution order is configured to improve data correlation between consecutively executed operator nodes and reduce memory overhead.

2. The sorting method according to claim 1, wherein determining the global depth of each node in the directed acyclic graph comprises:

wherein for any node in the directed acyclic graph, sequentially searching for output nodes of each following node in an output direction until no more output nodes are found, wherein the global depth of the node is defined as N+1, wherein N is a number of all nodes found during the search.

3. The sorting method according to claim 1, wherein after determining the global depth of each node, the sorting method further comprises:

determining whether a heuristic sorting set exists, and if the heuristic sorting set exists, updating global depths of corresponding nodes in the directed acyclic graph based on computational dependency relationships among nodes in the heuristic sorting set, execution order relationships among the corresponding nodes in the directed acyclic graph are the same as those among the nodes in the heuristic sorting set.

4. The sorting method according to claim 3, wherein the heuristic sorting set comprises a previous sorting result corresponding to the directed acyclic graph and a preset computational order among the nodes.

5. The sorting method according to claim 1, wherein after obtaining the execution order of each node and generating the node sorting table, the sorting method further comprises:

searching the node sorting table to confirm whether there exist nodes with a same execution order;

wherein when the nodes with the same execution order exist, then updating execution orders of the nodes with the same execution order according to an interval sorting rule, such that the execution orders of the nodes are different; and wherein the interval sorting rule comprises: when one of the nodes in the directed acyclic graph depends on multiple nodes, the node among the multiple nodes being depended on that has fewer data dependency relationships in the directed acyclic graph is ordered later during interval sorting.

6. The sorting method according to claim 5, wherein searching the node sorting table comprises sequentially searching each node corresponding to its execution order in the node sorting table from largest to smallest.

7. The sorting method according to claim 5, wherein for each execution order, searching is paused upon finding two nodes with the same execution order, and execution orders of the two nodes with the same execution order are updated according to the interval sorting rule.

8. The sorting method according to claim 7, wherein updating the execution orders of the two nodes with the same execution order according to the interval sorting rule comprises:

determining an interval start point and an interval end point for each of the two nodes with the same execution order; and updating the executions order of the two nodes with the same execution order by comparing numbers of nodes comprised in respective intervals corresponding to the two nodes.

9. The sorting method according to claim 8, wherein determining the interval start point and interval end point for each of the two nodes with the same execution order comprises:

wherein when there exist junction nodes between the two nodes in an input direction, using a latest-In-Junction node as the interval start point for each of the two nodes; otherwise, using respective inputs corresponding to the two nodes as their interval start points; and wherein when there exist junction nodes between the two nodes in an output direction, using a latest-Out-Junction node as the interval end point for each of the two nodes; otherwise, using the nodes themselves as their respective interval end points.

10. The sorting method according to claim 8, wherein updating the execution orders of the two nodes with the same execution order by comparing numbers of nodes comprised in respective intervals corresponding to the two nodes comprises:

wherein the numbers of nodes comprised in the respective intervals corresponding to the two nodes are different, among the two nodes, using the node corresponding to the interval with fewer nodes as a next node for the other node; and wherein the numbers of nodes comprised in the respective intervals corresponding to the two nodes are the same, selectively adjusting the intervals corresponding to the two nodes based on their interval start points.

11. The sorting method according to claim 10, wherein selectively adjusting the intervals corresponding to the two nodes based on their interval start points comprises:

wherein the interval start points of the two nodes are the latest-In-Junction node in the input direction, adjusting the respective intervals corresponding to the two nodes; and wherein the interval start points of the two nodes are their respective inputs, randomly updating the execution orders of the two nodes.

12. The sorting method according to claim 11, wherein adjusting the respective intervals corresponding to the two nodes comprises: using the inputs corresponding to the two nodes as their interval start points, using the nodes themselves as their interval end points, and then updating the execution orders of the two nodes by comparing the numbers of nodes comprised in their respective intervals.

13. The sorting method according to claim 11, wherein randomly updating the execution orders of the two nodes comprises: randomly selecting one of the two nodes as the next node for the other node.

14. The sorting method according to claim 5, wherein for each execution order, the searching is paused after finding all nodes corresponding to said execution order, and execution orders of all nodes corresponding to said execution order are updated according to the interval sorting rule.

15. A non-transitory computer-readable storage medium, storing a computer program, wherein the computer program, when executed by a processor, implements a sorting method for a computation graph of an artificial intelligence network model, the computation graph being a directed acyclic graph comprising nodes and directed edges; the method comprising:

acquiring the directed acyclic graph to be sorted by the processor, and recording, in a memory of the electronic device, input nodes and output nodes of each node in the directed acyclic graph; wherein each node in the directed acyclic graph corresponds to an operation of the artificial intelligence network model and each directed edge represents a data dependency between two nodes;

determining, by the processor, a global depth of each node by traversing, for each node in the directed acyclic graph, downstream nodes along directed edges until reaching an output node of the directed acyclic graph, and counting a number of nodes involved along traversal paths, thereby generating a global depth table;

determining, by the processor, an execution order of each node based on the global depth of each node and a total number of the nodes in the directed acyclic graph, wherein for a node in the directed acyclic graph, the execution order of the node is determined as a difference between the total number of nodes and the global depth of the node; and a node with a smaller global depth value is executed after a node with a larger global depth value; wherein nodes having a same execution order are further ordered based on data dependency relationships among the nodes; and generating, by the processor, a node sorting table according to the execution order, wherein the execution order is configured to improve data correlation between consecutively executed operator nodes and reduce memory overhead.

16. An electronic device, comprising:

a memory storing a computer program; and a processor in communication with the memory, configured to execute the sorting method according to claim 1 when the computer program is invoked.

* * * * *